(12) United States Patent
Naik et al.

(10) Patent No.: US 12,182,248 B2
(45) Date of Patent: Dec. 31, 2024

(54) TECHNIQUES FOR ESTABLISHING TRUSTED ENVIRONMENTS WITHIN A METAVERSE

(71) Applicant: Ally Financial Inc., Detroit, MI (US)

(72) Inventors: Harish Naik, Phoenix, AZ (US); Arvy Rajasekaran, Charlotte, NC (US); Dallas Gale, Phoenix, AZ (US); Dzmitry Dubarau, Charlotte, NC (US); Jared Allmond, Detroit, MI (US); Jordan Gilliam, Salem, NC (US); Michael Parello, Charlotte, NC (US); Sathish Muthukrishnan, Charlotte, NC (US)

(73) Assignee: Ally Financial Inc., Detroit, MI (US)

( * ) Notice: Subject to any disclaimer, the term of this patent is extended or adjusted under 35 U.S.C. 154(b) by 243 days.

(21) Appl. No.: 18/051,452

(22) Filed: Oct. 31, 2022

(65) Prior Publication Data

US 2024/0143721 A1    May 2, 2024

(51) Int. Cl.
*G06F 21/36*    (2013.01)
*G06T 13/40*    (2011.01)
*G06T 19/00*    (2011.01)

(52) U.S. Cl.
CPC .............. *G06F 21/36* (2013.01); *G06T 13/40* (2013.01); *G06T 19/006* (2013.01)

(58) Field of Classification Search
CPC ........ G06F 21/36; G06T 13/40; G06T 19/006
See application file for complete search history.

(56) References Cited

U.S. PATENT DOCUMENTS

| | | | |
|---|---|---|---|
| 9,055,131 B2* | 6/2015 | Van Wie | A63F 13/30 |
| 2011/0185286 A1* | 7/2011 | Moyers | H04L 12/1827 |
| | | | 715/752 |
| 2019/0202063 A1* | 7/2019 | Shukla | G10L 15/07 |
| 2021/0295303 A1* | 9/2021 | Phan | G06Q 20/4016 |
| 2022/0122062 A1* | 4/2022 | Mayblum | G06Q 20/381 |
| 2022/0165013 A1* | 5/2022 | Velez | A63F 13/213 |
| 2024/0193889 A1* | 6/2024 | Kim | G06T 19/20 |
| 2024/0223542 A1* | 7/2024 | Marchiorello | H04L 63/0428 |

* cited by examiner

*Primary Examiner* — Michael Won
(74) *Attorney, Agent, or Firm* — Holland & Hart LLP

(57) ABSTRACT

Methods, systems, and devices are described. A virtual environment may perform a multi-step authentication process to verify identities of both a user and a representative of an organization interacting within the virtual environment. Within the virtual environment, the representative may perform a first verification process to verify the identity of the user and the representative by validating the user's account information and an identifier of the representative against a distributed ledger. Upon success of the first verification process, the representative may initiate a second verification process. As part of the second verification process, the distributed ledger may provide one or more questions posed to the user by the representative, which may be answered within the virtual environment, external to the virtual environment, or both. Upon the user successfully answering the one or more questions, the virtual environment may display an indication that the user and the representative are verified.

20 Claims, 7 Drawing Sheets

TECHNIQUES FOR ESTABLISHING TRUSTED ENVIRONMENTS WITHIN A METAVERSE

FIELD OF TECHNOLOGY

The present disclosure relates generally to user authentication, and more specifically to techniques for establishing trusted environments within a metaverse.

BACKGROUND

Companies and organizations may provide rewards programs to users to increase engagement between the user and organizations. For example, an organization may partner with one or more third party vendors to offer a user rewards for actions taken by the user, which may be redeemable products or services provided by the third party vendors. In some cases, the organization, third party vendors, or both may provide or participate in a virtual environment (e.g., a three-dimensional virtual world), which may sometimes be referred to as a metaverse. To increase user engagement, the organization may enable the user to earn, redeem, and manage rewards points within the metaverse. However, interactions between users and representatives of the organization within the metaverse may be subject to unique security challenges.

SUMMARY

The described techniques relate to improved methods, systems, devices, and apparatuses that support techniques for establishing trusted environments within a metaverse. Generally, the described techniques provide for authenticating, within a three-dimensional virtual environment (e.g., a metaverse), both a user (e.g., a user's avatar) and a representative of an organization (e.g., a representative's avatar) using data stored within a distributed ledger. As an example, a system may establish a session between a user and a representative of an organization, which may be based on the user's avatar being within a threshold distance of the representative's avatar in the virtual environment. Upon establishment of the session, the user provides, within the virtual environment, information associated with an account that is provided to the user by the organization (e.g., an account number for a financial account provided to the user by a bank). The representative of the organization may then exchange signaling with a server associated with a distributed ledger to verify the account information, where the account information is validated against data stored in the distributed ledger. Such signaling may include a key associated with the representative that is also validated against data in the distributed ledger. Upon successful validation of the account information and the representative's key, the representative may exchange additional signaling with the distributed ledger to obtain one or more questions that are used to authenticate the user via the user's avatar and within the virtual environment. For instance, one or more of the questions obtained from the distributed ledger may be posed to the user's avatar within the virtual environment (e.g., the user may be asked to perform an action using their avatar in the metaverse, such as moving the avatar in a certain way). Upon confirming that the user's avatar responded to the question(s) in a correct manner, the user's avatar may be authenticated, and one or more icons may appear in the virtual environment to indicate that the user and the representative is verified. Likewise, the one or more icons may indicate verification of the representative's avatar, enabling the user to acknowledge that the representative (e.g., the representative's avatar) is a trusted representative of the organization, through which the user may communicate private information, inquiries, and advice, such as information related to private financial situations, rewards-based actions, among other examples.

A method is described. The method may include establishing a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization, receiving, from the first avatar or the user, or both, account information associated with at least one account provided by the organization to the user, performing a first sequence of processes to verify the account information and an identifier of the representative, wherein verification of the account information and the identifier is based at least in part on respective data validated against a distributed ledger, performing a second sequence of processes to authenticate the first avatar based at least in part on the first sequence of processes being successful, wherein the second sequence of processes uses one or more questions received from the distributed ledger, and indicating, within the three-dimensional virtual environment, that the first avatar and the second avatar are verified based at least in part on the second sequence of processes being successful.

An apparatus is described. The apparatus may include a processor, memory coupled with the processor, and instructions stored in the memory. The instructions may be executable by the processor to cause the apparatus to establish a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization, receive, from the first avatar or the user, or both, account information associated with at least one account provided by the organization to the user, perform a first sequence of processes to verify the account information and an identifier of the representative, wherein verification of the account information and the identifier is based at least in part on respective data validated against a distributed ledger, perform a second sequence of processes to authenticate the first avatar based at least in part on the first sequence of processes being successful, wherein the second sequence of processes uses one or more questions received from the distributed ledger, and indicate, within the three-dimensional virtual environment, that the first avatar and the second avatar are verified based at least in part on the second sequence of processes being successful.

Another apparatus is described. The apparatus may include means for establishing a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization, means for receiving, from the first avatar or the user, or both, account information associated with at least one account provided by the organization to the user, means for performing a first sequence of processes to verify the account information and an identifier of the representative, wherein verification of the account information and the identifier is based at least in part on respective data validated against a distributed ledger, means for performing a second sequence of processes to authenticate the first avatar based at least in part on the first sequence of processes being successful, wherein the second sequence of processes uses one or more questions received from the distributed ledger, and means for indicating, within the three-dimensional virtual environment, that the first avatar and the second avatar are verified based at least in part on the second sequence of processes being successful.

A non-transitory computer-readable medium storing code is described. The code may include instructions executable by a processor to establish a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization, receive, from the first avatar or the user, or both, account information associated with at least one account provided by the organization to the user, perform a first sequence of processes to verify the account information and an identifier of the representative, wherein verification of the account information and the identifier is based at least in part on respective data validated against a distributed ledger, perform a second sequence of processes to authenticate the first avatar based at least in part on the first sequence of processes being successful, wherein the second sequence of processes uses one or more questions received from the distributed ledger, and indicate, within the three-dimensional virtual environment, that the first avatar and the second avatar are verified based at least in part on the second sequence of processes being successful.

In some examples of the method, apparatuses, and non-transitory computer-readable medium described herein, performing the first sequence of processes may include operations, features, means, or instructions for transmitting, to a system providing the distributed ledger, a first application programming interface (API) call comprising the account information, receiving a hash key from the system in response to the first API call, transmitting, to the system, a second API call comprising the hash key and the identifier of the representative, and receiving, from the system, a message indicating whether the hash key and the identifier may be validated against the distributed ledger in response to the second API call, wherein the first sequence of processes may be successful based at least in part on the message indicating that the hash key and the identifier may be validated against the distributed ledger.

In some examples of the method, apparatuses, and non-transitory computer-readable medium described herein, performing the second sequence of processes may include operations, features, means, or instructions for transmitting, to a system providing the distributed ledger, a third application programming interface (API) call comprising a request for the one or more questions, receiving, from the system, a message comprising the one or more questions in response to the third API call, and transmitting the one or more questions to the first avatar or the user, or both, wherein the second sequence of processes may be successful based at least in part on one or more actions performed by the first avatar within the three-dimensional virtual environment in response to the one or more questions.

In some examples of the method, apparatuses, and non-transitory computer-readable medium described herein, the one or more questions may be transmitted via a network that may be separate from the three-dimensional virtual environment and the one or more questions may be transmitted from the representative directly to the user.

In some examples of the method, apparatuses, and non-transitory computer-readable medium described herein, the one or more questions may be transmitted via the three-dimensional virtual environment and the one or more questions may be transmitted from the second avatar directly to the first avatar.

Some examples of the method, apparatuses, and non-transitory computer-readable medium described herein may further include operations, features, means, or instructions for performing, by the first avatar, a third sequence of processes to verify an identity of the second avatar, wherein the third sequence of processes may be based at least in part on data within the distributed ledger.

In some examples of the method, apparatuses, and non-transitory computer-readable medium described herein, performing the third sequence of processes may include operations, features, means, or instructions for transmitting, to a system providing the distributed ledger, a fourth application programming interface (API) call comprising a request to validate the representative and receiving, from the system, a response indicating whether the representative may be validated against the distributed ledger, wherein the response indicates that the representative and the second avatar may be verified based at least in part on the identifier being validated against the distributed ledger.

In some examples of the method, apparatuses, and non-transitory computer-readable medium described herein, the third sequence of processes may be automatically triggered by the user or the first avatar, or both, scanning a quick response (QR) code associated with the second avatar.

In some examples of the method, apparatuses, and non-transitory computer-readable medium described herein, the one or more questions may be randomly selected from a plurality of predefined questions stored by the distributed ledger.

In some examples of the method, apparatuses, and non-transitory computer-readable medium described herein, the distributed ledger comprises a private distributed ledger associated with the organization.

In some examples of the method, apparatuses, and non-transitory computer-readable medium described herein, the threshold distance corresponds to an area surrounding the second avatar, or a boundary of a virtual office associated with the organization, or a boundary of a virtual storefront associated with the organization or any combination thereof.

DETAILED DESCRIPTION

Figure 1:
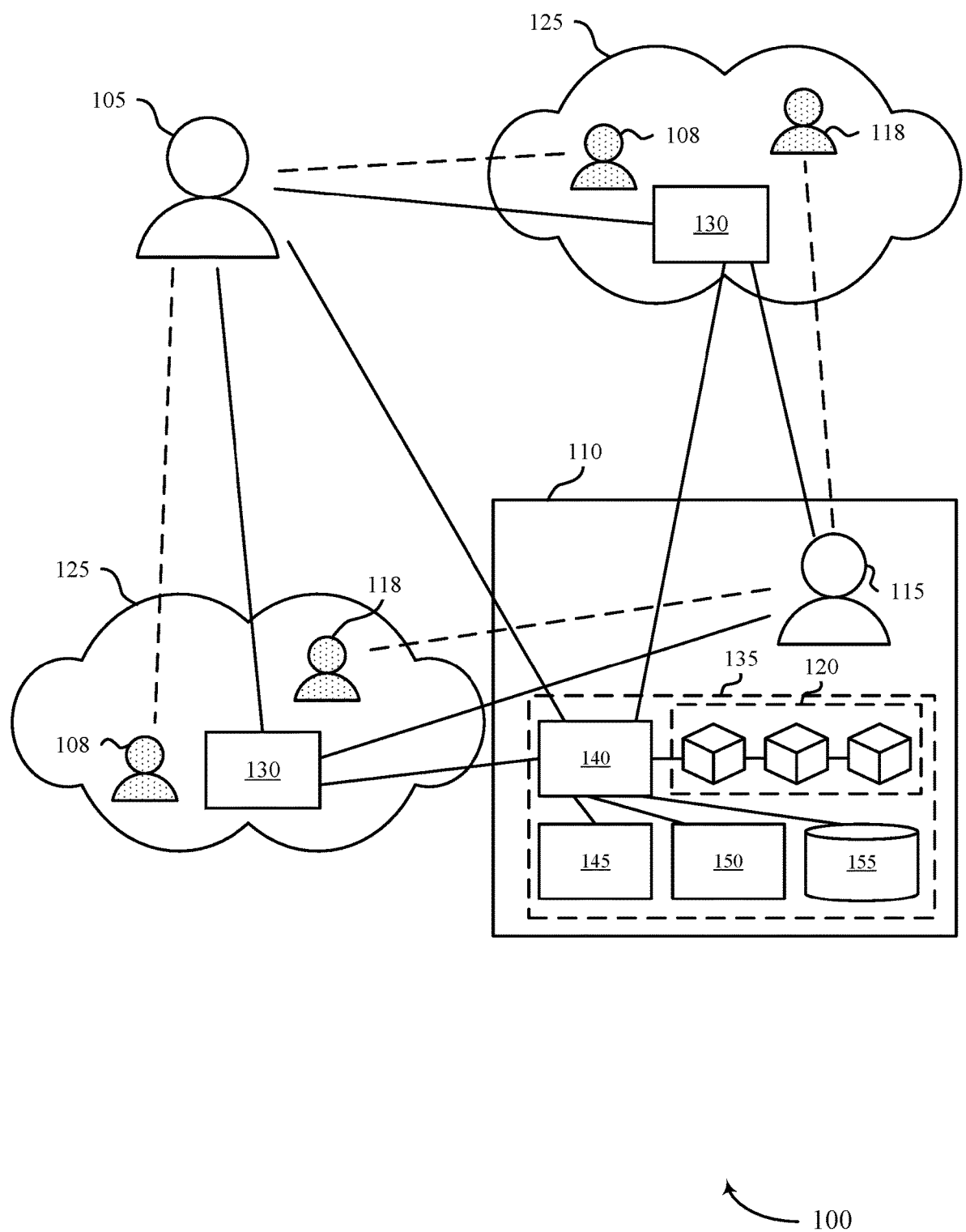
FIGS. 1 and 2 illustrate examples of systems that supports techniques for establishing trusted environments within a metaverse in accordance with aspects of the present disclosure.

A company or organization may provide rewards to customers, for example, who have an account with the organization (e.g., a financial institution, such as a bank). For instance, with points-based rewards systems, the organization may partner with third parties (e.g., vendors that provide goods or services), such that when a user (e.g., a customer of the organization) purchases some goods or services, or performs some predefined action(s), the user may be rewarded with points by the organization. The user may then redeem the rewards points for cash, goods, or services, or other rewards from various third party vendors. In some cases, to mitigate a delay between a rewardable action by the user and a corresponding change to the user's rewards balance (e.g., an award or redemption of rewards points), a rewards program may be implement using a distributed ledger, such as a blockchain, to track changes to the user's rewards balance. In such cases, the user may instantly see changes to a points balance and obtain details of the corresponding transactions (e.g., how the user has earned reward points) when the distribute ledger is updated. That is, blockchain and smart contracts may be used to manage loyalty and rewards schemes implemented by an organization.

Additionally, organizations may provide or participate in three-dimensional virtual environments (e.g., a metaverse) in which a user can interact with representatives of the organization and/or a representatives of a partnered third party. As such, to promote user engagement, the organization may allow the user to receive or redeem rewards points based on user actions within the virtual environment. As an example, a user (e.g., via a corresponding avatar within the metaverse) may interact with a representative of a financial organization to obtain information regarding one or more financial accounts, products, or services, where such interaction takes place within the three-dimensional virtual environment. However, performing such interactions within a virtual environment may introduce security risks, particularly when private information (e.g., private financial information) is involved. Moreover, virtual environments and the use of avatars representing users within the virtual environments provide unique challenges to user authentication and security of private and personal information. For example, a malicious third party may attempt to impersonate the user or organization's representative within the virtual environment. Accordingly, techniques to verify the identities of users and representatives within a virtual environment are desired.

As described herein, a virtual environment may perform a multi-step authentication process to verify identities of a user and a representative of a company interacting within the virtual environment. For example, a system providing the virtual environment may establish a session with the user and the representative of the company, which may be represented by a first avatar and a second avatar, respectively. In some aspects, the session may be established if the first avatar and second avatar are (virtually) within a threshold distance of each other. For instance, the organization may provide a virtual storefront within the three-dimensional virtual environment, and the representative of the organization (e.g., the second avatar) may be located at some predefined area or location associated with the virtual storefront. When the user (virtually) navigates the first avatar towards the second avatar and is within the threshold distance, the session may be established for a transaction and/or interaction between the first and second avatar. In such cases, the representative may initiate a first verification process and second verification process that each include a series of processes for validating data against data stored on a distributed ledger.

For example, as part of the first verification process the user may provide account information to the representative within the virtual environment, and the representative may transmit signaling to a system providing the distributed ledger (e.g., via an application programming interface (API) call to a system or server providing the distributed ledger). In response, the representative may revie a hash key based on the account information being validated against data stored in the distributed ledger. In some aspects, additional signaling (e.g., another API call) is sent to the system providing the distributed ledger, which may include the received hash key and an identifier (e.g., a unique identifier) associated with the representative. A response to the signaling may provide verification of the identifier and hash key based on comparing the information to data stored in the distributed ledger. Upon success of the first verification process, the virtual environment may initiate the second verification process. As part of the second verification process, the representative may transmit a request (e.g., an API call) one or more questions (e.g., security questions) to the system providing the distributed ledger. The system may respond with the one or more questions, which may then be provided to the user. Here, the questions may be provided to the user within the virtual environment or using other means. Upon the user successfully answering the one or more questions, the virtual environment may display an indication that the first avatar and the second avatar are verified. In some cases, additional authentication techniques may be implemented within the virtual environment, such as a code (e.g., a quick response (QR) code) associated with the representative that may be scanned by the user to independently and automatically validate the identity of the representative included in the session.

Particular aspects of the subject matter described herein may be implemented to realize one or more of the following potential advantages. The use of distributed ledger technology may enable fast and efficient validation of user information against data stored in the distributed ledger. As such, when a session is established in a virtual environment (e.g., a metaverse) between a user and a representative of an organization, accurate and efficient authentication of both the user and the representative may be achieved by signaling exchanges with a system providing the distributed ledger, which may validate any provided data with data that is stored in the distributed ledger. Moreover, the techniques described herein may enable enhanced security for individuals that interact with each other within a virtual environment (e.g., via avatars), particularly when private information is being exchanged between the individuals, such as financial information discussed between a customer and a financial institution. As such, the described techniques may increase user trust and confidence with interactions performed within a virtual environment, while also ensuring data is kept secure (e.g., avoiding release of secured data to unauthorized or malicious parties).

Figure 2:
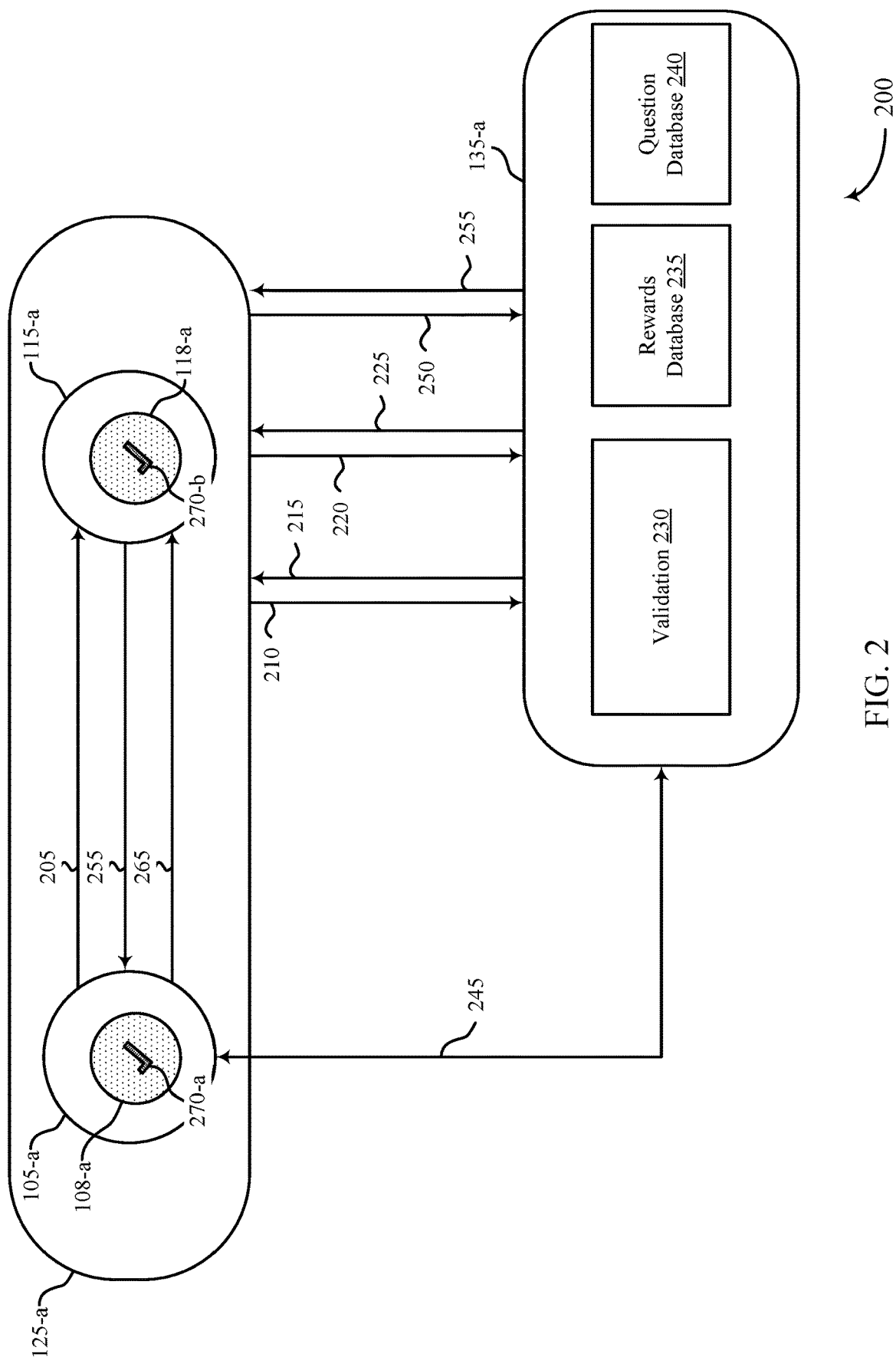
Figure 3:
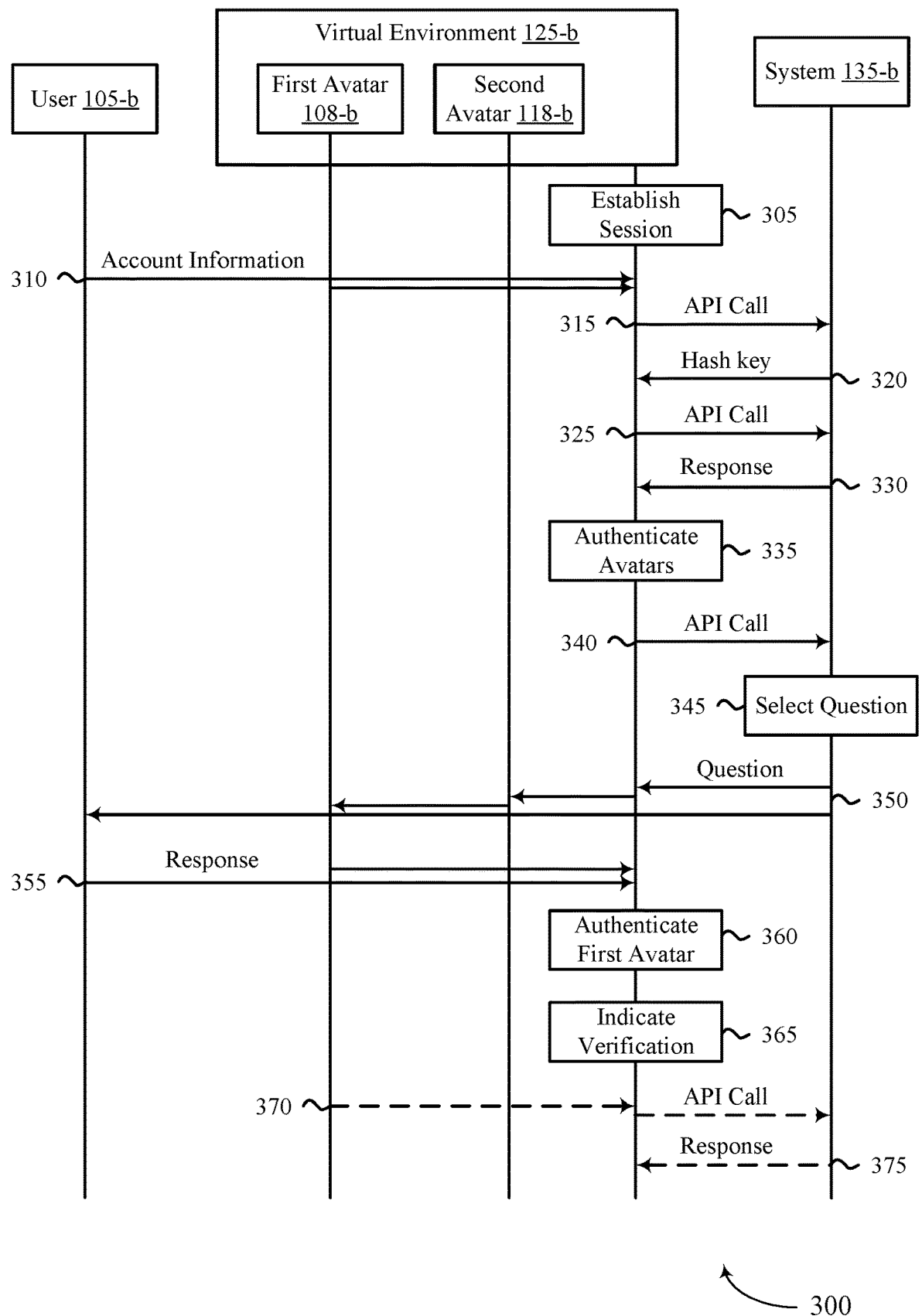
FIG. 3 illustrates an example of a process flow that supports techniques for establishing trusted environments within a metaverse in accordance with aspects of the present disclosure.

Aspects of the disclosure are initially described in the context of systems and a process flow with reference to FIGS. 1 through 3. Further examples are then provided that illustrate block diagrams and flow charts that support techniques for establishing trusted environments within a metaverse with reference to FIGS. 4 through 7.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally, or alternatively, solve other problems than those described herein. Further, aspects of the disclosure may provide technical improvements to "conventional" systems or processes as described herein. However, the description and appended drawings include example technical improvements resulting from implementing aspects of the disclosure, and accordingly do not represent all of the technical improvements provided within the scope of the claims.

FIG. 1 illustrates an example of a system 100 that supports techniques for establishing trusted environments within a metaverse in accordance with aspects of the present disclosure. The system 100 may include one or more users 105 which may interact with one or more organizations 110 (e.g., companies, banks, corporations, credit unions, lenders, or the like) over a network, such as the Internet. In some aspects, the system 100 may include one or more clients, servers, data centers, or the like. For example, a client may be used, by a user 105, to access the system 100 over a network connection. In some examples, a client may be an example of a user device, such as a server, a laptop, or a smartphone, among other examples. For instance, a client may be a desktop computer, a tablet, or another computing device or system capable of generating, analyzing, transmitting, or receiving communications. In some examples, a client may be operated by a customer (e.g., an individual or business) that purchases goods or service from an enterprise, company, or organization. Additionally, or alternatively, a client may be operated by a user that is part of a business, an enterprise, a non-profit, a startup, or any other organization type. For instance, a client may be used by a representative of an organization. In any case, a client may be used to provide a user 105 and an organization 110 with access to one or more virtual environments, which may be referred to as a three-dimensional virtual environments, metaverses, or some analogous terminology.

The organization 110 may be an example of a company or a business, such as a financial institution (e.g., a lender, a bank, or the like). Additionally, the user 105 may be a customer of the organization 110, for example, where the organization 110 may provide the user 105 with one or more financial accounts (e.g., for financial transactions). In other examples, the user 105 may not be a customer of the organization 110. Further, the organization 110 may include different types of organizations, companies, businesses, or vendors. The representative 115 may be an employee or authorized agent working on behalf of the organization 110. For example, the representative 115 may be an example of a mortgage lender, a wealth advisor, or other consultant authorized on behalf of the organization 110. In some aspects, the representative 115 may offer reward points to the user 105 for certain activities, such as making a purchase, attending a seminar, sharing social media posts, or other engagement with the representative 115 (or engagement with one or more other representatives 115).

The user 105 may interact with the organization 110 or representative 115 within the one or more three-dimensional virtual environments 125 (e.g., one or more metaverses). A three-dimensional virtual environment 125 may be an example of a spatial computing platform and may include one or more programs executed on one or more servers. The three-dimensional virtual environment 125 may enable users to interact with and traverse a virtual world. The three-dimensional virtual environment 125 may mimic some aspects of the physical world, providing a user 105 with digital experiences that replace and/or supplement real-world interactions, which may enable user interaction with a virtual world via extended reality (XR) technologies (e.g., multisensory XR technologies). XR technologies may include augmented reality (AR), virtual reality (VR), mixed reality (MR), and other related technologies. In some aspects, three-dimensional virtual environments 125 may enable interactions between two or more users (e.g., via respective avatars). In some aspects, three-dimensional virtual environments 125 may be public or private, and a user may gain access to a three-dimensional virtual environment 125 through the use of credentials that grant access to the three-dimensional virtual environment 125.

Thus, the user 105 may operate a user avatar 108 (e.g., via a client) within the three-dimensional virtual environment 125. For example, the user 105 may access the three-dimensional virtual environment 125 using a personal device (e.g., a virtual reality headset, a computer, a smartphone). The three-dimensional virtual environment 125 may represent the user 105 using the user avatar 108. The user 105 may control aspects of the user avatar 108, such as actions taken by the user avatar 108 (e.g., movement within the three-dimensional virtual environment 125, hand or arm gestures, facial expressions, speech or text within the three-dimensional virtual environment 125), the appearance of the user avatar 108 (e.g., clothing, facial features, body features), or both, among other examples. Additionally, the representative 115 may operate a representative avatar 118 within the virtual environment 125. The representative 115 may access the virtual environment 125 and control the representative avatar 118 in a manner similar to operation of the user avatar 108. For example, the representative 115 may control movement, gestures, appearance, or a combination thereof of the representative avatar 118.

In some cases, to increase the engagement of the user 105 with the organization 110, the organization 110 may offer reward points to the user 105 for certain purchases or behaviors. For example, the organization 110 may collaborate or partner with one or more vendors. The user 105 may redeem any earned rewards points with the organization 110 for goods and services, such as entry to a seminar, scheduling a meeting with a wealth advisor, cash rewards, discounts for goods or services provided by partnered organizations, and so on. A user 105 may accordingly enroll in a rewards platform managed by the organization 110. For example, the user 105 may create a profile or account on a platform managed by the organization 110. As part of creating the account, the user 105 may provide or may be assigned a unique identifier (e.g., a number associated with the user, a card number, or a combination thereof). Additionally, as part of enrolling the user 105, the organization 110 may create and provide a digital wallet to the user 105. The digital wallet may store a record of digital assets owned by the user 105, such as non-fungible tokens (NFTs), digital currencies (e.g., cryptocurrencies), as well as rewards points owned by the user 105, among other examples.

To record and manage reward points, the organization 110 may manage or participate in a distributed ledger 120. Distributed ledger technology (sometimes referred to as blockchain technology) may refer to a digital system of recording transactions and associated details simultaneously and in multiple places, where the distributed ledger 120 may not have a central data store or administration function. In some cases, multiple separate (e.g., decentralized) processing nodes may (e.g., via a network) process and verify the contents of respective entries in the distributed ledger 120 and may accordingly generate a consensus of the data included in the distributed ledger. The distributed ledger 120 may be used to record various types of information, such as static and dynamic data, financial transactions, among other examples.

The distributed ledger 120 may be provided by a system (e.g., one or more servers) that is managed by the organization 110. The distributed ledger 120 may be an example of a blockchain structure, which may maintain a decentralized record of transactions between users 105 and representative 115. For example, if a user 105 interacts with a representative 115 (or a third party vendor that is partnered with the organization 110) to acquire or redeem rewards points, the distributed ledger 120 may be updated (e.g., a block may be added to the distributed ledger 120) to include a record of the transaction. The record may include information such as an identifier for the user 105, an identifier for the representative 115, an amount by which the rewards points of the user 105 have changed, a record of previous interactions, or any combination thereof. In some examples, the distributed ledger 120 may include one or more channels. Each channel may be associated with a different organization (e.g., an organization different than the organization 110 managing the distributed ledger 120). Alternatively, the distributed ledger 120 may be an example of a private distributed ledger of the organization 110. That is, the security and validity of data making up (e.g., stored in) the distributed ledger 120 may be maintained by the organization 110 (e.g., in contrast to a public distributed ledger, which may involve outside sources validating data).

In some cases, the virtual environment 125 may be managed or operated by the organization 110. Accordingly, the virtual environment 125 may include or may implement an API 130, which may communicate, using API calls, with the distributed ledger 120. For example, the API 130 may support transmitting an API call to a system 135 which provides access to the distributed ledger 120. The system 135 may include or may implement an API 140 to access (e.g., to add an entry to, to search for a transaction) the distributed ledger 120. Additionally, or alternatively, the virtual environment 125 may be operated by an entity other than the organization 110. For example, the virtual environment 125 may be a public virtual environment. In such cases, the organization 110 may provide or support the API 130 within the virtual environment 125. In some aspects, the API 130 may be an example of a software development kit (SDK) or a plugin for one or more three-dimensional virtual environments that are managed by one or more organizations different than the organization 110.

The system 135 may manage account information associate with the user 105, the organization 110, the representative 115, or a combination thereof. For example, the system 135 may include a database 155, which may store account information in one or more non-volatile memory systems. The system 135 may include or may implement additional APIs associated with rewards point of the user 105, such as a deposits API 145, which may support API calls to deposit or redeem rewards point of a digital wallet of the user 105. The system 135 may also include a mortgage API 150, which may access or maintain information associated with a home loan or other loan of the user 105. Other example APIs may be included in or implemented by the system 135. Each of the API 140, the deposits API 145, and the mortgage API 150 may communicate with components of (e.g., using API calls), or may be implemented by, the system 135.

The user 105 and the organization 110 may enter into one or more agreements associated with earning and redeeming rewards points. Accordingly, the virtual environment 125 or the system 135 may monitor interactions within the virtual environment 125 to determine whether the interactions satisfy terms of the one or more agreements, and update the distributed ledger 120 accordingly. In some cases, the virtual environment 125 or the system 135 may implement dedicated software to perform the monitoring (e.g., may use a transaction protocol, such as a smart contract, to execute, control and document the interaction according to the terms of the agreement).

For example, in response to an initiation of a session associated with an interaction within the virtual environment 125, such as if the user avatar 108 and the representative avatar 118 are within a threshold distance of each other, the virtual environment 125 may monitor the interaction and update, using the API 130, account or wallet information of the user 105 and the representative 115 accordingly, as well as the distributed ledger 120.

In some examples, to access and modify the distributed ledger 120, both the user avatar 108 and the representative avatar 118 may be authenticated or validated. That is, upon detecting the interaction, the API 130 may verify the identity of the user avatar 108 and the representative avatar 118, such as by verifying that account information associated with and provided by the user avatar 108 correspond to the account of the user 105, and that the identity of the representative avatar 118 corresponds to the representative 115. To perform the authentication, the API 130 may transmit a series of API calls to the system 135 to obtain an indication from the system 135 that the account information of the user avatar 108 and the identifier of the representative avatar 118 are validated, as explained is greater detail with reference to FIGS. 2 through 4 below. In some cases, the API 130 may further validate the account information of the user avatar 108 using a multi-step verification process. For example, the API 130 may request a security question or instruction for the user avatar 108. If the user avatar 108 successfully answers the security question or security instruction, the user 105 may satisfy the multi-step verification process.

Upon successful verification of the user avatar 108 and the representative avatar 118, the virtual environment 125 may display an indication that the interaction is verified. For example, the virtual environment 125 may display a check mark or other visual cue that both the user avatar 108 and the representative avatar 118 are verified. Accordingly, the virtual environment 125 may, using the API 130, provide a digital indication associated with the user avatar 108 and the representative avatar 118 to indicate, to both the user 105 and the representative 115, that interactions within the three-dimensional virtual environment are authenticated. In addition, the distributed ledger 120 may be updated to reflect subsequent interactions between the user avatar 108 and the representative avatar 118, such as by awarding or redeeming rewards points to or from the digital wallet of the user 105, and may record the associated transaction in the distributed ledger 120. The user 105, the representative 115, or both may access and view a record of the transaction using one or more applications, for example within the virtual environment 125 or using a personnel device.

FIG. 2 illustrates an example of a system 200 that supports techniques for establishing trusted environments within a metaverse in accordance with aspects of the present disclosure. The system 200 may include a virtual environment 125-a, a user avatar 108-a, representative avatar 118-a of a company or organization and a system 135-a, which may each be an example of the corresponding entity as described with reference to FIG. 1. For instance, a user 105-a (e.g., a user 105 as described with reference to FIG. 1) may control the user avatar 108-a using one or more devices, such as one or more computers, mobile devices, or using other hardware or software that enables interaction with the virtual environment 125-a via the user avatar 108-a. Likewise, a representative 115-a (e.g., a representative 115 described with reference to FIG. 1) of the organization (e.g., an organization 110, as described with reference to FIG. 1), may be an employee of the organization and may control the representative avatar 118-a using one or more devices. The user 105-a associated with the user avatar 108-a may have an account with the company or organization In some cases, the organization may track and maintain rewards points for the user 105-a. In some examples, the user 105-a may not have an account with the organization and may accordingly be a prospective customer of the organization. In any case, the system 200 may illustrate aspects of a process to verify the identity of the user avatar 108-a, verify the identity of the representative avatar 118-a, or both. In some examples, such verification may enable the management of rewards points of the user 105-a, as provided via a rewards program offered by the organization.

By way of example, the user 105-a may access the virtual environment 125-a, and may navigate the user avatar 108-a to an area, location, event, or a combination thereof, within the virtual environment 125-a associated with the company and in which the representative avatar 118-a may be located, such as a virtual bank, a virtual seminar, a virtual meeting, a virtual storefront, a virtual office space, or a combination thereof, among other examples. Upon navigating the user avatar 108-a to a (virtual) location within a threshold (virtual) distance of the representative avatar 118-a, the user avatar 108-a and the representative avatar 118-a may perform an authentication process to each verify the identity of the other. Such authentication may be used to ensure security of confidential data, such as private financial information, that is exchanged between the user avatar 108-a and the representative avatar 118-a.

For example, the user 105-a (e.g., the user avatar 108-a) may transmit identification data 205, such as a card number (e.g., debit card, credit card)) or account number associated with the account of the user, a social security number of the user, or other unique identifiers of the user, to the representative avatar 118-a via the virtual environment 125-a. As an example, the identification data 205 may be transmitted using an API call (e.g., validateCustomerinfo):

```
validateCustomerInfo
post
{
Account: "abc" (debit/credit card, account number)
}
```

Here, "abc" may represent some data that indicates an account or other identifier associated with the user 105-a and provided by the organization. Thus, the user 105-a may transmit the identification data 205 via the virtual environment 125-a (e.g., using the user avatar 108-a). In other examples, the user 105-a may transmit the identification data 205 externally, such as through a website or other portal associated with the company.

Upon receiving the identification data 205, a hashing function may be performed on the identification data 205 to obtain a hash value 210. The representative 115-a and or/the representative avatar 118-a, via the virtual environment 125-a, may then transmit the hash value 210 to the system 135-a. For example, an API call may be signaled to the system 135-a to verify the hash value 210.

The system 135-a may receive the hash value 210 and may validate the hash value 210 using the validation component 230. In some cases, the validation component 230 may be an example of or may include aspects of the distributed ledger 120, and may be configured to determine whether the hash value 210 corresponds to the user 105-a. For example, the validation component 230 may, using the distributed ledger 120, determine whether the received hash value 210 matches a hash value of the account information (e.g., a copy of the identification data 205) for the user 105-a stored by the system 135-a (e.g., stored in a database 155, as described with reference to FIG. 1). Upon successful verification of the hash value 210, the system 135-a may return a hash key 215 to the virtual environment 125-a as a response to the API call. As an example of the API call (e.g., verifyCustomer) including the hash value 210 (e.g., the account information) and the response to the API call may be represented as:

```
verifyCustomer
post
{
Account: "abc"
Metaverse room Id: "metaverse-id"
}
Response
{
Hashkey (sha-256): "64 chars"
}
```

In some cases, the hash key 215 may be the result of a second hashing function of the hash value 210, or may be the result of a separate class of function of the hash value 210. Accordingly, the virtual environment 125-a may verify the identity of the user avatar 108-a based on validating the account information of the user 105-a. In some aspects, the API call may include additional information, such as an identifier of the virtual environment 125-a (e.g., a metaverse identifier), which may further correspond to the virtual environment where the user avatar 108-a and the representative avatar 118-a are located within the virtual environment 125-a.

To verify the identity of the representative avatar 118-a, the virtual environment 125-a may issue the hash key 215 to the representative avatar 118-a. The representative avatar 118-a may then transmit the hash key 215 and an identifier 220 associated with the representative avatar 118-a, such as an employee or partner identification number, to the system 135-a. In some cases, the representative avatar 118-a may transmit the hash key 215 and the identifier 220 using the virtual environment 125-a such as by executing an API call to the system 135-a. Additionally, or alternatively, the representative avatar 118-a may transmit the hash key 215 and the identifier 220 using external methods, such as through a website or other portal associated with the system 135-*a*.

The system 135-*a* may receive the hash key 215 and the identifier 220 and may validate the hash key 215 and the identifier 220 using the validation component 230 (e.g., the distributed ledger 120 of the validation component 230) to determine whether the hash key 215 corresponds to the user 105-*a* and whether the identifier 220 corresponds to the representative avatar 118-*a* (e.g., to verify whether the representative avatar 118-*a* is authorized to manage rewards points of the user 105-*a*). Upon performing verification of the hash key 215 and the identifier 220, the system 135-*a* may return a result 225 to the virtual environment 125-*a* (e.g., as a response to the API call) indicating whether the verification was successful. An example of the API call (e.g., verifyAdvisor) including the hash key and the identifier 220, as well as the response to the API call may be represented as:

```
verifyAdvisor
post
{
Hashkey (sha-256): "64 chars"
Id: ["advisor-id", "", ""] - near-by advisors
```

```
}
Response
{
response: "success/failure"
JWT token: "claims/user/advisor/room id/ expiration time"
}
```

Here, the response to the API call verifyAdvisor may also include additional information, such as information included in a JavaScript Object Notation (JSON) web token (JWT) format. In some examples, if the hash key is invalid, an error message may be returned by the system 135-*a*.

In some examples, the user 105-*a* (e.g., via the user avatar 108-*a*) may independently verify the identity of the representative avatar 118-*a*. For example, within the virtual environment 125-*a*, the representative avatar 118-*a* may provide or may be positioned in the vicinity of a virtual identifier 245, such as a QR code. Using the user avatar 108-*a*, the user 105-*a* may scan the virtual identifier to determine (e.g., automatically, upon scanning the virtual identifier) whether the virtual identifier 245 is associated with the identity of the representative avatar 118-*a*. For example, scanning the virtual identifier 245 may issue an API call to the system 135-*a* to verify the identifier 220 of the representative avatar 118-*a* using the distributed ledger 120 of the validation component 230. As a response to the API call, the system 135-*a* may return a message indicating whether the identifier 220 was successfully verified.

Additional steps may be performed within the virtual environment 125-*a* to verify the identity of and authenticate the user 105-*a*. For example, as part of a second verification process, the representative 115-*a* may transmit a request 250 for one or more questions (e.g., an authentication test) stored in a question database 240 of the system 135-*a*. The questions stored in the question database 240 may be examples of security questions within the context of the virtual environment 125-*a* to verify that the user 105-*a* is human (e.g., that the user avatar 108-*a* is not being controlled by a program, such as a program implemented by a malicious third party). For example, the security questions may instruct the user 105-*a* to perform certain actions using the user avatar 108-*a*, such as performing a gesture (e.g., a hand wave, a hand shake), modifying the appearance of the user avatar 108-*a* (e.g., changing an outfit or other visual aspect of the user avatar 108-*a*), moving to a particular location within the virtual environment, or a combination thereof.

The system 135-*a* may select a subset of questions 255 of the questions stored in the question database 240, and may transmit the subset of questions 255 to the representative avatar 118-*a*, for example as a response to the request 250. In some cases, the system 135-*a* may select the subset of questions 255 randomly, or using another secure selection method. In some cases, an example of an API call (e.g., getChallengeQuestions) including the request 250, as well as the response to the API call with the subset of questions 255 (e.g., ChallengeQuestions), may be represented as:

```
getChallengeQuestions
post
{
JWT token: "claims/user/advisor/room id"
}
Response
{
ChallengeQuestions: ['','','','']
}
```

Upon receiving the subset of questions 255, the representative avatar 118-*a* may issue the subset of questions 255 to the user 105-*a* (e.g., through the user avatar 108-*a* and via the virtual environment 125-*a*). For example, the representative avatar 118-*a* may issue the subset of questions 255 using signaling within the virtual environment 125-*a*. For example, the subset of questions 255 may be transmitted to the user 105-*a* using an API call. The user 105-*a* may issue a response 265 to the subset of questions 255, such as by performing a gesture or task indicated by the subset of questions 255 within the virtual environment 125-*a*. In some cases, an example of an API call (e.g., postChallenge) including the signaling including the subset of questions 255, as well as the corresponding response 265 that is based on the actions of the user avatar 108-*a* and indicating whether the user avatar 108-*a* successfully responded to the subset of questions, may be represented as:

```
postChallenge
post
{
JWT token: "claims/user/advisor/room id",
ChallengeQuestions: ['','','','']
}
Response
{
response: "success/failure"
}
```

Additionally, or alternatively, the representative avatar 118-*a* may issue the subset of questions 255 using methods external to the virtual environment 125-*a*. For example, the subset of questions 255 may be transmitted to the user 105-*a* using a text message, using an email, via an online portal associated with the system 135-*a*, or any combination thereof. The user 105-*a* may issue a response 265 to the subset of questions 255, such as by performing a gesture or task indicated by the subset of questions 255 within the virtual environment 125-*a*, by responding to externally received questions, or any combination thereof.

As an illustrative example, the representative 115-*a* may transmit electronic communication (e.g., an email, a text message, a voice message, a phone call) to the user 105-*a*, which may be used to convey one or more of the subset of questions 255 to the user 105-*a*, which may be performed without involvement of the virtual environment 125-*a*. In such cases, the user 105-*a* may provide a response to the subset of questions 255 within the virtual environment 125-*a* via the user avatar 108-*a*. The user 105-*a* may receive a text message (e.g., at a phone number on record with the organization) that requests, for example, that the user avatar 108-*a* wave the avatar's left hand three times. In response, the user 105-*a* may control the user avatar 108-*a* to repeat the requested action within the virtual environment 125-*a*. Upon viewing the actions performed by the user avatar 108-*a* in the virtual environment 125-*a*, the representative 115-*a* may verify that the user 105-*a* is in control of the user avatar 108-*a*. In yet other examples, the security questions may instruct the user 105-*a* to perform an action external to the virtual environment 125-*a*, such as sending a text message (e.g., using a cellular device of the user 105-*a*) to the system 135-*a* containing a code indicated by the question or other textual information.

Upon the user 105-*a* successfully responding to the subset of questions 255, the virtual environment 125-*a* may verify the identity of the user avatar 108-*a*. If the virtual environment 125-*a* has also verified the identity of the representative avatar 118-*a* (e.g., using the hash key 215 and the identifier 220), the virtual environment 125-*a* may display one or more verification identifications 270 (e.g., verification identification 270-*a*, verification identification 270-*b*). For example, the virtual environment 125-*a* may display a verification identification 270-*a* (e.g., an icon or other identifier) on or within the vicinity of the user avatar 108-*a*, the virtual environment 125-*a* may display a verification identification 270-*b* on or within the vicinity of the representative avatar 118-*a*, or both. In some examples, the verification identification 270 may appear as a colored check-mark (e.g., a green check-mark) or other symbol. Accordingly, the user 105-*a* may receive or redeem rewards points, in accordance with one or more offers or agreements (e.g., smart contracts) within a rewards database 235 of the system 135-*a*.

FIG. 3 illustrates an example of a process flow 300 that supports techniques for establishing trusted environments within a metaverse in accordance with aspects of the present disclosure. The process flow 300 or aspects thereof may be implemented by a user 105-*b*, a first avatar 108-*b* (e.g., a user avatar associated with the user 105-*b*, such as a user avatar 108 and user avatar 108-*a* described with reference to FIGS. 1 and 2) and a second avatar 118-*b* (e.g., a representative avatar associated with an organization) within a virtual environment 125-*b* (e.g., a three-dimensional virtual environment, a metaverse), and a system 135-*b* implementing a distributed ledger, which may each be examples of the corresponding entities as described with reference to FIGS. 1 and 2. In the following description of the process flow 300, the operations may be performed in a different order than the order shown. For example, specific operations may also be left out of the process flow 300, or other operations may be added to process flow 300.

The process flow 300 may illustrate a method to verify the identity of the first avatar 108-*b* and the second avatar 118-*b*. For example, at 305, the virtual environment 125-*b* may establish a session with the user 105-*b* within the virtual environment 125-*b*. In some cases, the virtual environment 125-*b* may monitor the location of the first avatar 108-*b* and may establish the session in response to detecting that the first avatar 108-*b* is located within a threshold distance of the second avatar 118-*b*. In some examples, the threshold may correspond to an area surrounding the second avatar 118-*b*, or a boundary of a virtual office or virtual storefront associated with the organization, or a boundary of a virtual storefront associated with the organization, or any combination thereof, among other examples.

A first sequence of processes to verify account information and an identifier of the representative may be performed in the virtual environment 125-*b*. For example, at 310, the virtual environment 125-*b* may receive, from the first avatar 108-*b* or the user, or both, account information associated with at least one account provided by the organization to the user 105-*b*.

At 315, an API associated with the virtual environment 125-*b* may transmit, to the system 135-*b* providing the distributed ledger, a first API call, which may include the account information. Accordingly, at 320, the system 135-*b* may receive the first API call validate the account information using the distributed ledger. Upon validation, the system 135-*b* may generate a hash key using the account information and transmit the hash key to the virtual environment 125-*b* in response to the first API call.

At 325, the API associated with the virtual environment 125-*b* may transmit, to the system 135-*b*, a second API call, which may include the hash key and an identifier of the representative associated with the second avatar 118-*b*. Accordingly, at 330, the system 135-*b* may receive the second API call and may validate the hash key and the identifier using the distributed ledger. Upon validation, the system 135-*b* may generate a message indicating whether the hash key and the identifier are validated against the distributed ledger in response to the second API call. Accordingly, at 335, in response to a message indicating that the hash key and the identifier are validated performing a first sequence of processes to verify the account information and an identifier of the representative, the virtual environment 125-*b* may verify the identity of the first avatar 108-*b* and the second avatar 118-*b*.

A second sequence of processes to authenticate the first avatar 108-*b* may be performed in the virtual environment 125-*b* and in response to the first sequence of processes being successful. For example, at 340, the API associated with the virtual environment 125-*b* may transmit, to the system 135-*b* providing the distributed ledger, a third API call which may include a request for one or more questions.

At 345, the system 135-*b* may receive the third API call, and may select one or more questions from a database (e.g., the question database 240). In some cases, the one or more questions may be randomly selected from a set of predefined questions stored by the distributed ledger. Accordingly, at 350, the system 135-*b* may transmit a message which may include the one or more questions to the virtual environment 125-*b* in response to the third API call. In some cases, the virtual environment 125-*b*, the system 135-*b*, or both may transmit the one or more questions to the first avatar 108-*b* or the user 105-*b*, or both. In some cases, the one or more questions may be transmitted via a network that is separate from the virtual environment 125-*b*, such as transmitting the one or more questions directly from the representative to the user 105-*b* (e.g., via an email using the Internet, via a text message using a wireless communications network, or the like).

At 355, the user 105-*b* may, using the first avatar 108-*b* or an external method (e.g., via a website, an email, a text message, a portal associated with the system 135-*b*), transmit a response to the one or more questions. Accordingly, if the virtual environment 125-*b* determines that the response is correct, the virtual environment 125-*b* may, at 360, authenticate the identity of the first avatar 108-*b*. Thus, at 365, the virtual environment 125-*b* may indicate, within the virtual environment 125-*b*, that the first avatar 108-*b* and the second avatar 118-*b* are verified. For instance, one or more icons may appear within the virtual environment 125-*b* to indicate the respective verified status of the first avatar 108-*b* and the second avatar 118-*b*.

At 370 (or at any time after the session is established at 305) the user 105-*b* may perform a third sequence of processes to verify an identity of the second avatar 118-*b*. For example, the user 105-*b* may transmit, to the system 135-*b*, a fourth API call which may include a request to validate the representative. In some examples, the third sequence of processes may be automatically triggered by the user 105-*b* or the first avatar 108-*b*, or both, by scanning a QR code associated with the second avatar 118-*b* (e.g., the QR code may appear in the virtual environment 125-*b* and may be scanned by the user 105-*b* using various means).

Accordingly, at 375, the system 135-*b* may receive the fourth API call and may, using the distributed ledger, verify the identity of the second avatar 118-*b*. The system 135-*b* may transmit, to the user 105-*b*, the first avatar 108-*b*, or both, a response indicating whether the representative is validated against the distributed ledger. In some cases, the response may indicate that the representative and the second avatar are verified in response to the identifier being validated against the distributed ledger.

Figure 4:
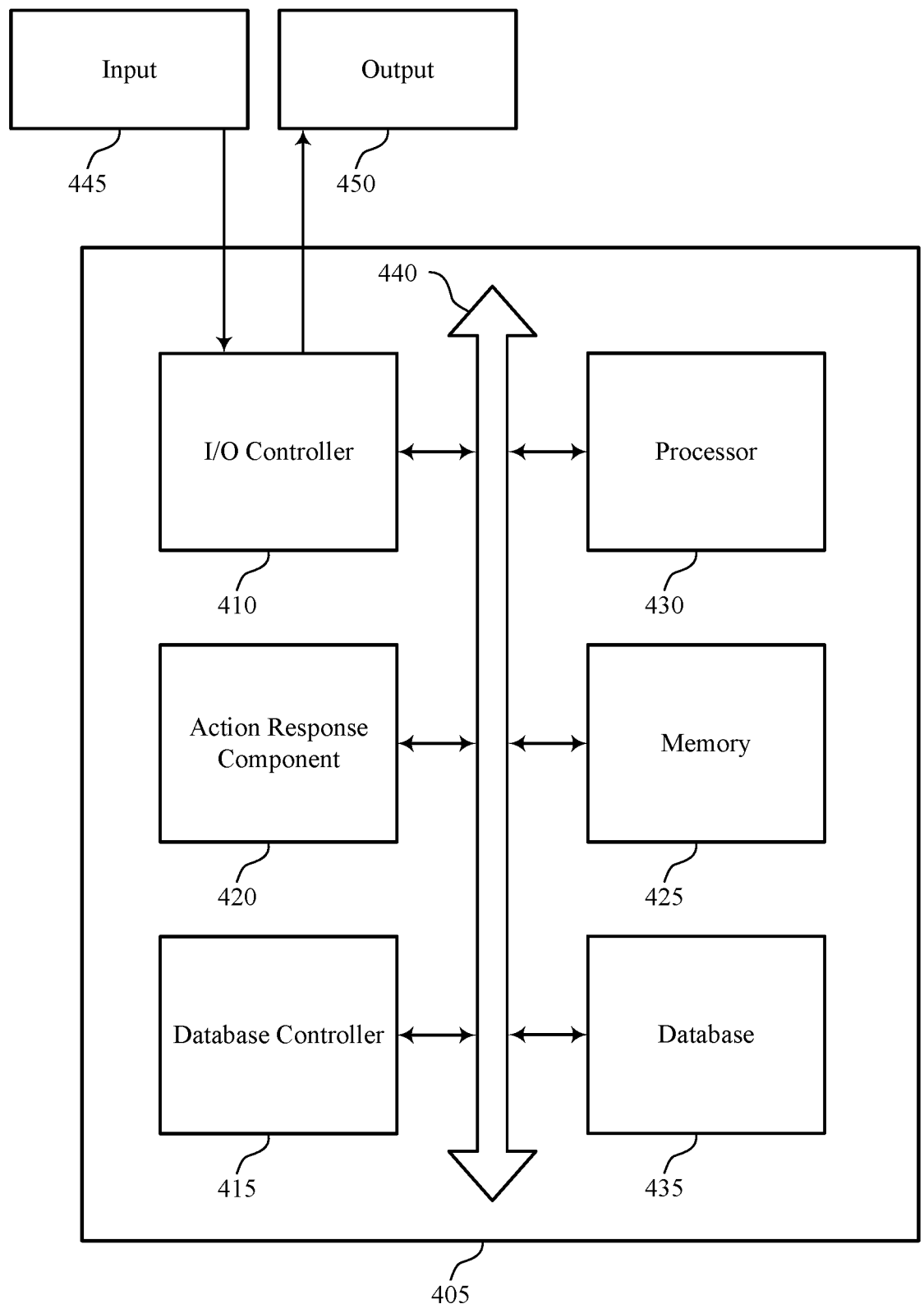
FIG. 4 illustrates an example of a block diagram that supports techniques for establishing trusted environments within a metaverse in accordance with aspects of the present disclosure.

FIG. 4 illustrates a diagram of a system 400 including a device 405 that supports techniques for establishing trusted environments within a metaverse in accordance with aspects of the present disclosure. The device 405 may include components for bi-directional voice and data communications including components for transmitting and receiving communications, such as an action response component 420, an input/output (I/O) controller 410, a database controller 415, a memory 425, a processor 430, and a database 435. These components may be in electronic communication or otherwise coupled (e.g., operatively, communicatively, functionally, electronically, electrically) via one or more buses (e.g., a bus 440).

The I/O controller 410 may manage input signals 445 and output signals 450 for the device 405. The I/O controller 410 may also manage peripherals not integrated into the device 405. In some cases, the I/O controller 410 may represent a physical connection or port to an external peripheral. In some cases, the I/O controller 410 may utilize an operating system such as iOS®, ANDROID®, MS-DOS®, MS-WINDOWS®, OS/2®, UNIX®, LINUX®, or another known operating system. Additionally, or alternatively, the I/O controller 410 may represent or interact with a modem, a keyboard, a mouse, a touchscreen, or a similar device. In some cases, the I/O controller 410 may be implemented as part of a processor. In some examples, a user may interact with the device 405 via the I/O controller 410 or via hardware components controlled by the I/O controller 410.

The database controller 415 may manage data storage and processing in a database 435. The database 435 may be external to the device 405, temporarily or permanently connected to the device 405, or a data storage component of the device 405. In some examples, the database 435 may be an example of, include, or be coupled with a server. In some cases, a user may interact with the database controller 415. In some other cases, the database controller 415 may operate automatically without user interaction. The database 435 may be an example of a persistent data store, a single database, a distributed database, multiple distributed databases, a database management system, or an emergency backup database.

Memory 425 may include random-access memory (RAM) and read-only memory (ROM). The memory 425 may store computer-readable, computer-executable software including instructions that, when executed, cause the processor to perform various functions described herein. In some cases, the memory 425 may contain, among other things, a BIOS which may control basic hardware or software operation such as the interaction with peripheral components or devices.

The processor 430 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 430 may be configured to operate a memory array using a memory controller. In some other cases, a memory controller may be integrated into the processor 430. The processor 430 may be configured to execute computer-readable instructions stored in memory 425 to perform various functions (e.g., functions or tasks supporting techniques for establishing trusted environments within a metaverse).

For example, the action response component 420 may be configured as or otherwise support a means for establishing a session with a user within a three-dimensional virtual environment, where the established session is based on a first avatar being located within a threshold distance of a second avatar within the three-dimensional virtual environment, the first avatar being associated with the user and the second avatar being associated with a representative of an organization. The action response component 420 may be configured as or otherwise support a means for receiving, from the first avatar or the user, or both, account information associated with at least one account provided by the organization to the user. The action response component 420 may be configured as or otherwise support a means for performing a first sequence of processes to verify the account information and an identifier of the representative, where verification of the account information and the identifier is based on respective data validated against a distributed ledger. The action response component 420 may be configured as or otherwise support a means for performing a second sequence of processes to authenticate the first avatar based on the first sequence of processes being successful, where the second sequence of processes uses one or more questions received from the distributed ledger. The action response component 420 may be configured as or otherwise support a means for indicating, within the three-dimensional virtual environment, that the first avatar and the second avatar are verified based on the second sequence of processes being successful.

By including or configuring the action response component 420 in accordance with examples as described herein, the device 405 may support techniques for establishing trusted environments within a metaverse. In particular, aspects of the functions performed by the action response component 420 may enable the efficient authentication of respective avatars within a three-dimensional virtual environment (e.g., a metaverse), which may include an exchange of one or more signals with a system that provides a distributed ledger (e.g., a blockchain server). Such signaling exchange may enable fast and accurate verification of data that is stored via the distributed ledger (e.g., where the data may not be tampered with, modified, or manipulated in accordance with the features of distributed ledger technology), which may enable seamless and accurate authentication of user information (e.g., account information) and one or more identifiers associated with a representative of an organization (e.g., an organization associated with the distributed ledger). In such cases, authentication of users (and their respective avatars within the metaverse) may overcome unique challenges associated with security and authentication within one or more virtual environments, thereby enhancing the ability of users and organizations to safely interact, and exchange private information, within such virtual environments.

Figure 5:
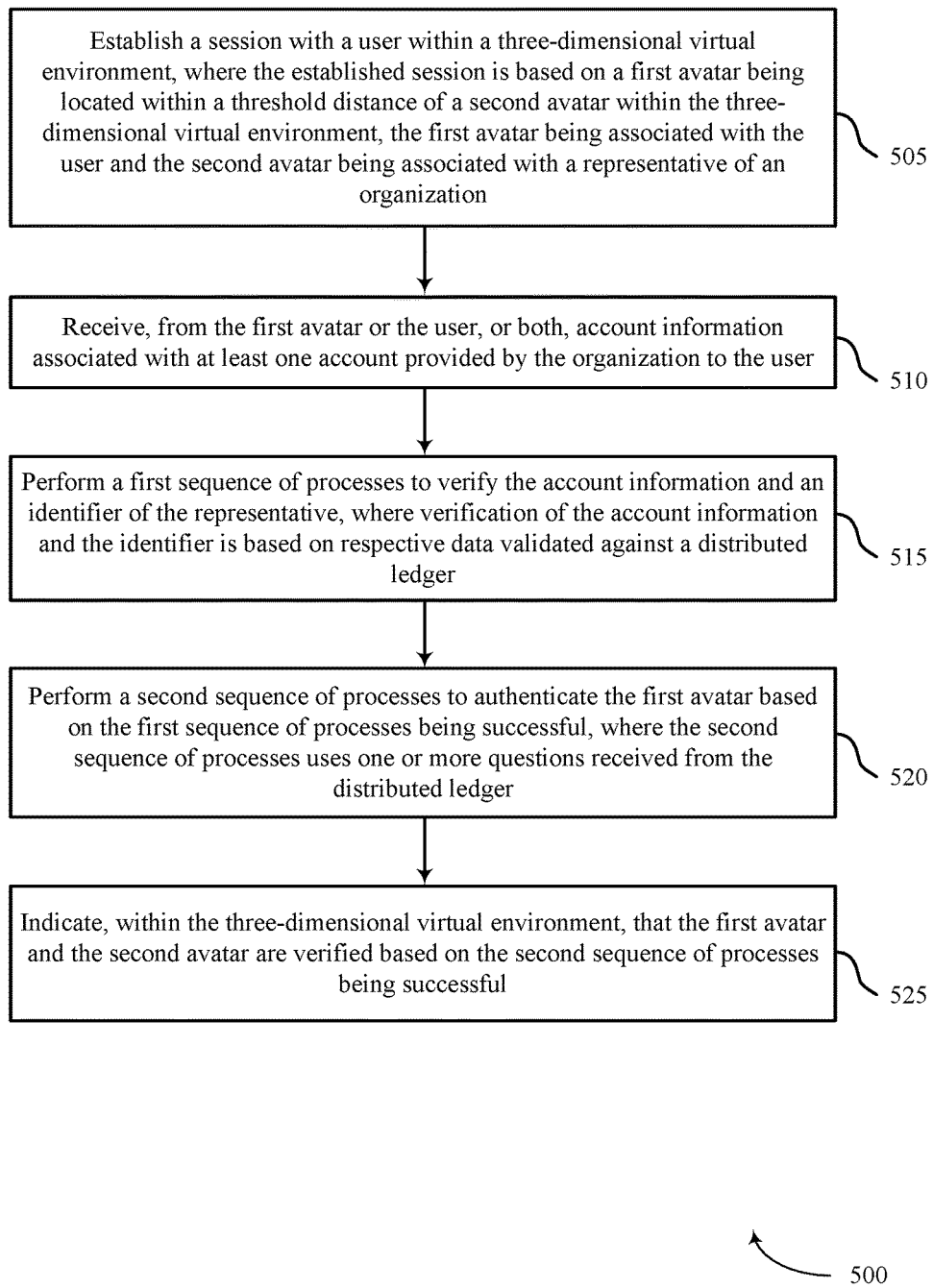
FIGS. 5 through 7 illustrate flowcharts showing a method that supports techniques for establishing trusted environments within a metaverse in accordance with aspects of the present disclosure.

FIG. 5 illustrates a flowchart showing a method 500 that supports techniques for establishing trusted environments within a metaverse in accordance with aspects of the present disclosure. The operations of the method 500 may be implemented by a virtual environment or its components as described herein. For example, the operations of the method 500 may be performed by a virtual environment as described with reference to FIGS. 1 through 4. In some examples, a virtual environment may execute a set of instructions to control the functional elements of the virtual environment to perform the described functions. Additionally, or alternatively, the virtual environment may perform aspects of the described functions using special-purpose hardware.

At 505, the method may include establishing a session with a user within a three-dimensional virtual environment, where the established session is based on a first avatar being located within a threshold distance of a second avatar within the three-dimensional virtual environment, the first avatar being associated with the user and the second avatar being associated with a representative of an organization. The operations of 505 may be performed in accordance with examples as disclosed herein.

At 510, the method may include receiving, from the first avatar or the user, or both, account information associated with at least one account provided by the organization to the user. The operations of 510 may be performed in accordance with examples as disclosed herein.

At 515, the method may include performing a first sequence of processes to verify the account information and an identifier of the representative, where verification of the account information and the identifier is based on respective data validated against a distributed ledger. The operations of 515 may be performed in accordance with examples as disclosed herein.

At 520, the method may include performing a second sequence of processes to authenticate the first avatar based on the first sequence of processes being successful, where the second sequence of processes uses one or more questions received from the distributed ledger. The operations of 520 may be performed in accordance with examples as disclosed herein.

At 525, the method may include indicating, within the three-dimensional virtual environment, that the first avatar and the second avatar are verified based on the second sequence of processes being successful. The operations of 525 may be performed in accordance with examples as disclosed herein.

In some examples, an apparatus as described herein may perform a method or methods, such as the method 500. The apparatus may include features, circuitry, logic, means, or instructions (e.g., a non-transitory computer-readable medium storing instructions executable by a processor) for establishing a session with a user within a three-dimensional virtual environment, where the established session is based on a first avatar being located within a threshold distance of a second avatar within the three-dimensional virtual environment, the first avatar being associated with the user and the second avatar being associated with a representative of an organization, receiving, from the first avatar or the user, or both, account information associated with at least one account provided by the organization to the user, performing a first sequence of processes to verify the account information and an identifier of the representative, where verification of the account information and the identifier is based on respective data validated against a distributed ledger, performing a second sequence of processes to authenticate the first avatar based on the first sequence of processes being successful, where the second sequence of processes uses one or more questions received from the distributed ledger, and indicating, within the three-dimensional virtual environment, that the first avatar and the second avatar are verified based on the second sequence of processes being successful.

In some examples of the method 500 and the apparatus described herein, performing the first sequence of processes may include operations, features, circuitry, logic, means, or instructions for transmitting, to a system providing the distributed ledger, a first API call including the account information, receiving a hash key from the system in response to the first API call, transmitting, to the system, a second API call including the hash key and the identifier of the representative, and receiving, from the system, a message indicating whether the hash key and the identifier may be validated against the distributed ledger in response to the second API call, where the first sequence of processes may be successful based on the message indicating that the hash key and the identifier may be validated against the distributed ledger.

In some examples of the method 500 and the apparatus described herein, performing the second sequence of processes may include operations, features, circuitry, logic, means, or instructions for transmitting, to a system providing the distributed ledger, a third API call including a request for the one or more questions, receiving, from the system, a message including the one or more questions in response to the third API call, and transmitting the one or more questions to the first avatar or the user, or both, where the second sequence of processes may be successful based on one or more actions performed by the first avatar within the three-dimensional virtual environment in response to the one or more questions.

In some examples of the method 500 and the apparatus described herein, the one or more questions may be transmitted via a network that may be separate from the three-dimensional virtual environment and the one or more questions may be transmitted from the representative directly to the user.

In some examples of the method 500 and the apparatus described herein, the one or more questions may be transmitted via the three-dimensional virtual environment and the one or more questions may be transmitted from the second avatar directly to the first avatar.

Some examples of the method 500 and the apparatus described herein may further include operations, features, means, or instructions for performing, by the first avatar, a third sequence of processes to verify an identity of the second avatar, where the third sequence of processes may be based on data within the distributed ledger.

In some examples of the method 500 and the apparatus described herein, performing the third sequence of processes may include operations, features, circuitry, logic, means, or instructions for transmitting, to a system providing the distributed ledger, a fourth API call including a request to validate the representative and receiving, from the system, a response indicating whether the representative may be validated against the distributed ledger, where the response indicates that the representative and the second avatar may be verified based on the identifier being validated against the distributed ledger.

In some examples of the method 500 and the apparatus described herein, the third sequence of processes may be automatically triggered by the user or the first avatar, or both, scanning a QR code associated with the second avatar.

In some examples of the method 500 and the apparatus described herein, the one or more questions may be randomly selected from a plurality of predefined questions stored by the distributed ledger.

In some examples of the method 500 and the apparatus described herein, the distributed ledger includes a private distributed ledger associated with the organization.

In some examples of the method 500 and the apparatus described herein, the threshold distance corresponds to an area surrounding the second avatar, or a boundary of a virtual office associated with the organization, or a boundary of a virtual storefront associated with the organization or any combination thereof.

Figure 6:
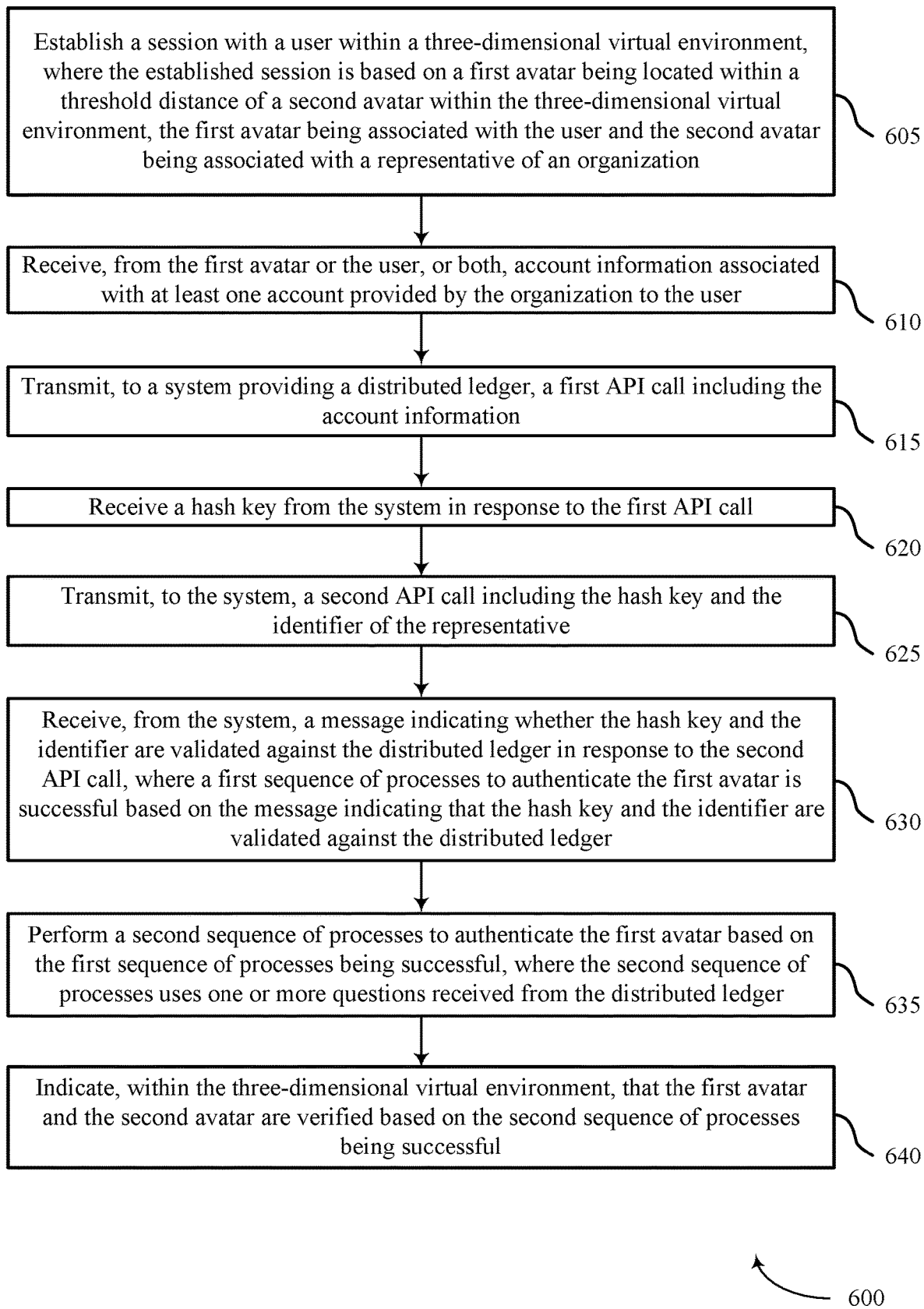

FIG. 6 illustrates a flowchart showing a method 600 that supports techniques for establishing trusted environments within a metaverse in accordance with aspects of the present disclosure. The operations of the method 600 may be implemented by a virtual environment or its components as described herein. For example, the operations of the method 600 may be performed by a system providing a virtual environment (e.g., a server providing a three-dimensional virtual environment) as described with reference to FIGS. 1 through 4. In some examples, the system and/or components thereof may execute a set of instructions to control the functional elements of the virtual environment to perform the described functions. Additionally, or alternatively, the system and/or the components thereof may perform aspects of the described functions using special-purpose hardware.

At 605, the method may include establishing a session with a user within a three-dimensional virtual environment, where the established session is based on a first avatar being located within a threshold distance of a second avatar within the three-dimensional virtual environment, the first avatar being associated with the user and the second avatar being associated with a representative of an organization. The operations of 605 may be performed in accordance with examples as disclosed herein.

At 610, the method may include receiving, from the first avatar or the user, or both, account information associated with at least one account provided by the organization to the user. The operations of 610 may be performed in accordance with examples as disclosed herein.

At 615, the method may include transmitting, to a system providing a distributed ledger, a first API call including the account information. The operations of 615 may be performed in accordance with examples as disclosed herein.

At 620, the method may include receiving a hash key from the system providing the distributed ledger in response to the first API call. The operations of 620 may be performed in accordance with examples as disclosed herein.

At 625, the method may include transmitting, to the system, a second API call including the hash key and the identifier of the representative. The operations of 625 may be performed in accordance with examples as disclosed herein.

At 630, the method may include receiving, from the system providing the distributed ledger, a message indicating whether the hash key and the identifier are validated against the distributed ledger in response to the second API call, where a first sequence of processes to authenticate the first avatar is successful based on the message indicating that the hash key and the identifier are validated against the distributed ledger. The operations of 630 may be performed in accordance with examples as disclosed herein.

At 635, the method may include performing a second sequence of processes to authenticate the first avatar based on the first sequence of processes being successful, where the second sequence of processes uses one or more questions received from the distributed ledger. The operations of 635 may be performed in accordance with examples as disclosed herein.

At 640, the method may include indicating, within the three-dimensional virtual environment, that the first avatar and the second avatar are verified based on the second sequence of processes being successful. The operations of 640 may be performed in accordance with examples as disclosed herein.

Figure 7:
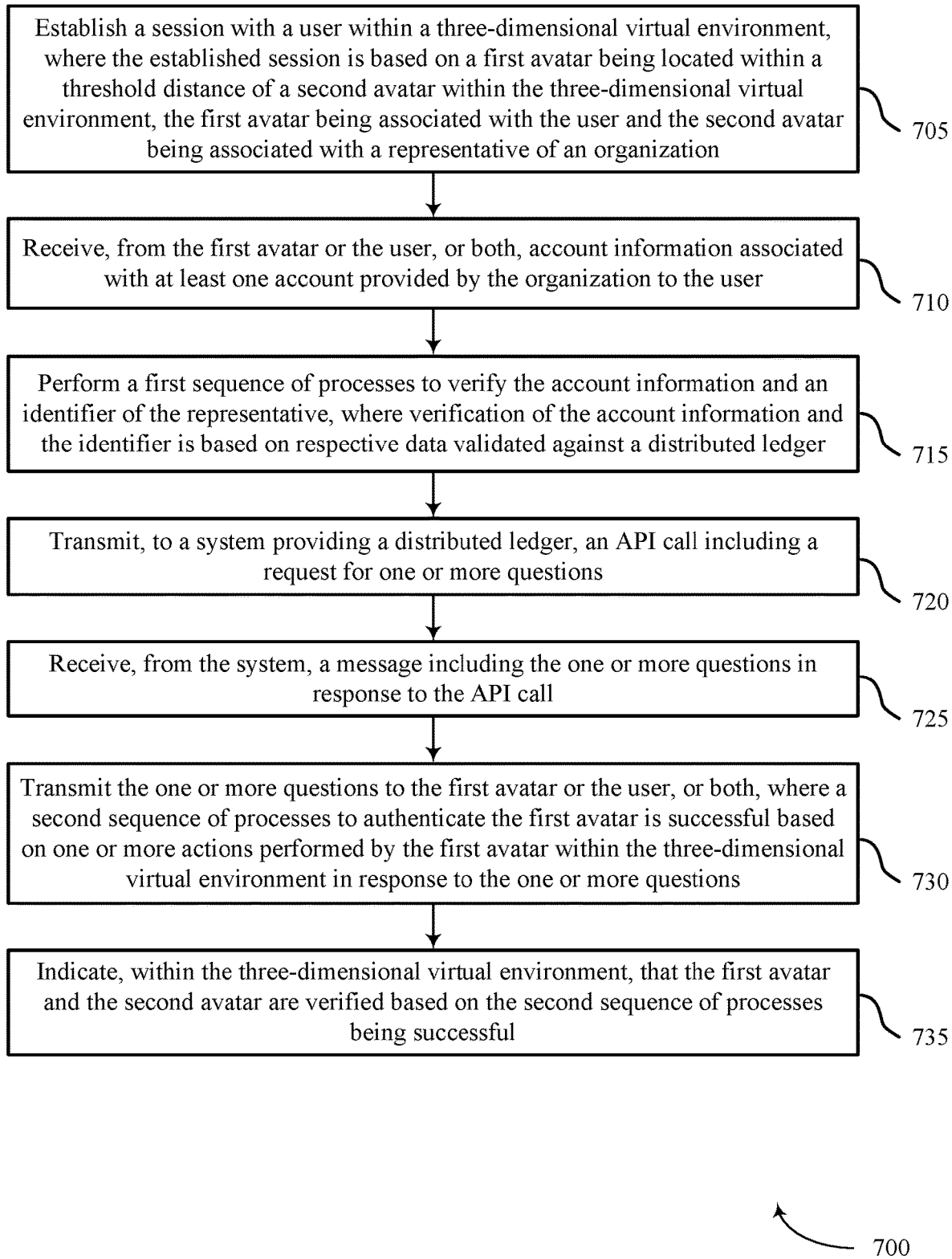

FIG. 7 illustrates a flowchart showing a method 700 that supports techniques for establishing trusted environments within a metaverse in accordance with aspects of the present disclosure. The operations of the method 700 may be implemented by a virtual environment or its components as described herein. For example, the operations of the method 700 may be performed by a system providing a virtual environment (e.g., a server providing a three-dimensional virtual environment) as described with reference to FIGS. 1 through 4. In some examples, the system and/or components thereof may execute a set of instructions to control the functional elements of the virtual environment to perform the described functions. Additionally, or alternatively, the system and/or the components thereof may perform aspects of the described functions using special-purpose hardware.

At 705, the method may include establishing a session with a user within a three-dimensional virtual environment, where the established session is based on a first avatar being located within a threshold distance of a second avatar within the three-dimensional virtual environment, the first avatar being associated with the user and the second avatar being associated with a representative of an organization. The operations of 705 may be performed in accordance with examples as disclosed herein.

At 710, the method may include receiving, from the first avatar or the user, or both, account information associated with at least one account provided by the organization to the user. The operations of 710 may be performed in accordance with examples as disclosed herein.

At 715, the method may include performing a first sequence of processes to verify the account information and an identifier of the representative, where verification of the account information and the identifier is based on respective data validated against a distributed ledger. The operations of 715 may be performed in accordance with examples as disclosed herein.

At 720, the method may include transmitting to a system providing a distributed ledger, an API call including a request for one or more questions. The operations of 720 may be performed in accordance with examples as disclosed herein.

At 725, the method may include receiving, from the system providing the distributed ledger, a message including the one or more questions in response to the API call. The operations of 725 may be performed in accordance with examples as disclosed herein.

At 730, the method may include transmitting the one or more questions to the first avatar or the user, or both, where a second sequence of processes to authenticate the first avatar is successful based on one or more actions performed by the first avatar (e.g., virtually) within the three-dimensional virtual environment in response to the one or more questions. The operations of 730 may be performed in accordance with examples as disclosed herein.

At 735, the method may include indicating, within the three-dimensional virtual environment, that the first avatar and the second avatar are verified based on the second sequence of processes being successful. The operations of 735 may be performed in accordance with examples as disclosed herein.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    establishing a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization;
    receiving, from the first avatar or the user, or both, account information associated with at least one account provided by the organization to the user;
    performing a first sequence of processes to verify the account information and an identifier of the representative, wherein verification of the account information and the identifier is based at least in part on respective data validated against a distributed ledger;
    performing a second sequence of processes to authenticate the first avatar based at least in part on the first sequence of processes being successful, wherein the second sequence of processes uses one or more questions received from the distributed ledger; and
    indicating, within the three-dimensional virtual environment, that the first avatar and the second avatar are verified based at least in part on the second sequence of processes being successful.

2. The method of claim 1, wherein performing the first sequence of processes comprises:
    transmitting, to a system providing the distributed ledger, a first application programming interface (API) call comprising the account information;
    receiving a hash key from the system in response to the first API call;
    transmitting, to the system, a second API call comprising the hash key and the identifier of the representative; and
    receiving, from the system, a message indicating whether the hash key and the identifier are validated against the distributed ledger in response to the second API call, wherein the first sequence of processes is successful based at least in part on the message indicating that the hash key and the identifier are validated against the distributed ledger.

3. The method of claim 1, wherein performing the second sequence of processes comprises:
    transmitting, to a system providing the distributed ledger, a third application programming interface (API) call comprising a request for the one or more questions;
    receiving, from the system, a message comprising the one or more questions in response to the third API call; and
    transmitting the one or more questions to the first avatar or the user, or both, wherein the second sequence of processes is successful based at least in part on one or more actions performed by the first avatar within the three-dimensional virtual environment in response to the one or more questions.

4. The method of claim 3, wherein the one or more questions are transmitted via a network that is separate from the three-dimensional virtual environment, and the one or more questions are transmitted from the representative directly to the user.

5. The method of claim 3, wherein the one or more questions are transmitted via the three-dimensional virtual environment, and the one or more questions are transmitted from the second avatar directly to the first avatar.

6. The method of claim 1, further comprising:
    performing, by the first avatar, a third sequence of processes to verify an identity of the second avatar, wherein the third sequence of processes is based at least in part on data within the distributed ledger.

7. The method of claim 6, wherein performing the third sequence of processes comprises:
    transmitting, to a system providing the distributed ledger, a fourth application programming interface (API) call comprising a request to validate the representative; and
    receiving, from the system, a response indicating whether the representative is validated against the distributed ledger, wherein the response indicates that the representative and the second avatar are verified based at least in part on the identifier being validated against the distributed ledger.

8. The method of claim 6, wherein the third sequence of processes is automatically triggered by the user or the first avatar, or both, scanning a quick response (QR) code associated with the second avatar.

9. The method of claim 1, wherein the one or more questions are randomly selected from a plurality of predefined questions stored by the distributed ledger.

10. The method of claim 1, wherein the distributed ledger comprises a private distributed ledger associated with the organization.

11. The method of claim 1, wherein the threshold distance corresponds to an area surrounding the second avatar, or a boundary of a virtual office associated with the organization, or a boundary of a virtual storefront associated with the organization or any combination thereof.

12. A non-transitory computer-readable medium storing code, the code comprising instructions executable by a processor to:
    establish a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization;

receive, from the first avatar or the user, or both, account information associated with at least one account provided by the organization to the user;

perform a first sequence of processes to verify the account information and an identifier of the representative, wherein verification of the account information and the identifier is based at least in part on respective data validated against a distributed ledger;

perform a second sequence of processes to authenticate the first avatar based at least in part on the first sequence of processes being successful, wherein the second sequence of processes uses one or more questions received from the distributed ledger; and indicate, within the three-dimensional virtual environment, that the first avatar and the second avatar are verified based at least in part on the second sequence of processes being successful.

13. The non-transitory computer-readable medium of claim 12, wherein the instructions to perform the first sequence of processes are executable by the processor to:

transmit, to a system providing the distributed ledger, a first application programming interface (API) call comprising the account information;

receive a hash key from the system in response to the first API call;

transmit, to the system, a second API call comprising the hash key and the identifier of the representative; and receive, from the system, a message indicating whether the hash key and the identifier are validated against the distributed ledger in response to the second API call, wherein the first sequence of processes is successful based at least in part on the message indicating that the hash key and the identifier are validated against the distributed ledger.

14. The non-transitory computer-readable medium of claim 12, wherein the instructions to perform the second sequence of processes are executable by the processor to:

transmit, to a system providing the distributed ledger, a third application programming interface (API) call comprising a request for the one or more questions;

receive, from the system, a message comprising the one or more questions in response to the third API call; and transmit the one or more questions to the first avatar or the user, or both, wherein the second sequence of processes is successful based at least in part on one or more actions performed by the first avatar within the three-dimensional virtual environment in response to the one or more questions.

15. The non-transitory computer-readable medium of claim 14, wherein the one or more questions are transmitted via a network that is separate from the three-dimensional virtual environment, and the one or more questions are transmitted from the representative directly to the user.

16. The non-transitory computer-readable medium of claim 14, wherein:

the one or more questions are transmitted via the three-dimensional virtual environment, and the one or more questions are transmitted from the second avatar directly to the first avatar.

17. The non-transitory computer-readable medium of claim 12, wherein the instructions are further executable by the processor to:

perform, by the first avatar, a third sequence of processes to verify an identity of the second avatar, wherein the third sequence of processes is based at least in part on data within the distributed ledger.

18. The non-transitory computer-readable medium of claim 17, wherein the instructions to perform the third sequence of processes are executable by the processor to:

transmit, to a system providing the distributed ledger, a fourth application programming interface (API) call comprising a request to validate the representative; and receive, from the system, a response indicating whether the representative is validated against the distributed ledger, wherein the response indicates that the representative and the second avatar are verified based at least in part on the identifier being validated against the distributed ledger.

19. The non-transitory computer-readable medium of claim 17, wherein the third sequence of processes is automatically triggered by the user or the first avatar, or both, scanning a quick response (QR) code associated with the second avatar.

20. An apparatus, comprising:

a controller associated with a memory device, wherein the controller is configured to cause the apparatus to:

establish a session with a user within a three-dimensional virtual environment, wherein the established session is based at least in part on a first avatar being located within a threshold distance of a second avatar within the three-dimensional virtual environment, the first avatar being associated with the user and the second avatar being associated with a representative of an organization;

receive, from the first avatar or the user, or both, account information associated with at least one account provided by the organization to the user;

perform a first sequence of processes to verify the account information and an identifier of the representative, wherein verification of the account information and the identifier is based at least in part on respective data validated against a distributed ledger;

perform a second sequence of processes to authenticate the first avatar based at least in part on the first sequence of processes being successful, wherein the second sequence of processes uses one or more questions received from the distributed ledger; and indicate, within the three-dimensional virtual environment, that the first avatar and the second avatar are verified based at least in part on the second sequence of processes being successful.

* * * * *